United States Patent Office 2,785,159
Patented Mar. 12, 1957

2,785,159
AZACARBOCYCLES AND PROCESS FOR THEIR MANUFACTURE

Karl Hoffmann, Binningen, Hansjakob Schmid, Riehen, and Alfred Hunger, Basel, Switzerland, assignors to Ciba Pharmaceutical Products, Inc., Summit, N. J.

No Drawing. Application April 26, 1954,
Serial No. 425,744

Claims priority, application Switzerland April 29, 1953

14 Claims. (Cl. 260—239.3)

This invention relates to a novel process and to compounds obtained thereby. More particularly, the invention relates to the process which comprises reacting 2-(tertiary aminoalkyl)-1-oxo-carbocycles with hydrazoic acid and to the (tertiary aminoalkyl)-oxo-azacarbocycles thus obtained in which the two said substituents are in the ortho-positions relatively to the ring nitrogen atom, more especially to 2-(tertiary aminoalkyl)-6-oxo-1-azahexacarbocycles, such as 2-(tertiary aminoalkyl)-6-oxo-piperidines and 2-(tertiary aminoalkyl)-7-oxo-1-azaheptacarbocycles, such as 2-(tertiary aminoalkyl)-7-oxo-1-azacycloheptanes and salts thereof. The azacarbocyclic residue may contain substituents or have a ring fused thereto, such as a benzene ring. The invention provides more especially 3-(tertiary aminoalkyl)-1-oxo-1:2:3:4-tetrahydro-isoquinolines and 2-(tertiary aminoalkyl)-7-oxo-5:6-benzo-1-azacycloheptenes-(5). The tertiary amino group may be more especially a dialkylamino or an alkylene-amino group, of which the alkylene chain may be interrupted by hetero-atoms such as oxygen or nitrogen. Preferably there may be mentioned dimethylamino, diethylamino, pyrrolidino, piperidino and morpholino groups. The alkylene residue of the amino alkyl group may have a straight or branched chain, and is more especially a methylene, ethylene or propylene residue.

The reaction of hydrazoic acid with ketones is known per se as the Schmidt reaction (cf. Schmidt, Zeitschrift fuer angewandte Chemie, 36, page 511, 1923, and Organic Reactions III, page 307, 1947).

By the known reactions there are obtained almost exclusively mixtures of isomeric acid amides (cf. Smith and Horwitz, Journal of the American Chemical Society 72, page 3718 (1950). Starting with 2-(tertiary aminoalkyl)-1-oxo-carbocycles it would be expected that isomers would be formed, in which either the aminoalkyl group has remained in ortho-position to the oxo group and the ring nitrogen has entered on the other side of the oxo group, or in which the ring nitrogen has entered between the oxo group and the aminoalkyl group.

It was found in accordance with the present invention that only one isomer in excellent yields is formed, viz. the one in which the ring nitrogen has entered between the aminoalkyl group and the oxo group, when hydrazoic acid is reacted with 2-(tertiary aminoalkyl)-1-oxo-carbocycles. Thus, for example, when an α-tetralone is used as starting material the process may be represented by the following equation:

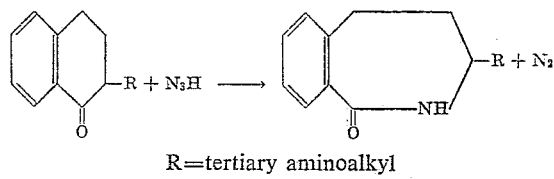

R=tertiary aminoalkyl

The reaction is advantageously carried out in the presence of a diluent and an acidic catalyst such as sulfuric acid, trifluoroacetic acid, borontrifluoride-etherate, aluminum chloride and the like. The hydrazoic acid is advantageously formed in the reaction medium from an azide, especially sodium azide, or applied as a solution, for example, in an organic solvent such as chloroform or benzene. It is especially advantageous to work in the presence of highly concentrated sulfuric acid, and this method may be carried out in various ways. Thus, an azide, such as sodium azide, may be added to a solution of the oxo-carbocycle in sulfuric acid or in a mixture of sulfuric acid and an organic solvent such as chloroform, or such a solution may be added to a solution of hydrazoic acid in, for example, chloroform. It is also possible to add highly concentrated sulfuric acid, if desired together with an organic solvent to a solution of the oxo-carbocycle and hydrazoic acid in an organic solvent.

Depending on the method used, the products are obtained in the form of their free bases or salts. Salts, preferably non-toxic, may be prepared from the free bases by reaction with an acid, such, for example, as a hydrohalic acid, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene sulfonic acid or toluene sulfonic acid.

The new compounds are valuable intermediates for the preparation of medicaments. In addition by reaction with reactive esters of higher aliphatic alcohols, especially dodecyl chloride, they may be converted into quaternary ammonium compounds which possess disinfecting properties.

The following examples illustrate the invention, the parts being by weight unless otherwise stated and the relationship of parts by weight to parts by volume being the same as that of the gram to the cubic centimeter:

Example 1

53.2 parts of 2-piperidinomethyl-indanone-(1) hydrochloride are introduced in the cold into 210 parts by volume of sulfuric acid of 90 percent strength, and 10 parts of sodium azide are added at 0–5° C. in the course of 2–3 hours. The whole is then stirred for one hour at 22° C., poured on to ice, and neutralized with sodium carbonate. The oil which precipitates is taken up in ethyl acetate, and the solution is dried over magnesium sulfate, filtered and evaporated in vacuo. There is obtained in a yield of 86.4 percent 3-piperidino-methyl-1-oxo-1:2:3:4-tetrahydroisoquinoline of the formula

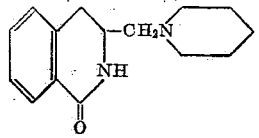

which melts at 108–110° C. after recrystallization from alcohol. It forms a hydrochloride melting at 259–262° C. In order to prepare the hydrochloride the free base is dissolved in a small amount of alcohol, the solution is mixed with hydrochloric acid in ethyl acetate until the reaction is acid, and then the mixture is evaporated to dryness. The residue is recrystallized from alcohol, and the aforesaid hydrochloride is obtained.

Example 2

28 parts of 2-piperidino methyl-tetralone-(1) hydrochloride are dissolved in 190 parts by volume of sulfuric acid of 90 percent strength in the cold, and then the whole is mixed with 10 parts of pulverized sodium azide at a temperature below 0° C., while stirring, in the course of 2 hours. The whole is stirred for a further ½ hour, and then heated to room temperature, poured after a further ½ hour on to ice, and neutralized with solid sodium carbonate. The oil which precipitates is taken up in ethyl acetate, dried over magnesium sulfate, and then filtered and evaporated to dryness. The 2-piperidino-methyl-7-oxo-5:6-benzo-1-azacycloheptene-(5) of the formula

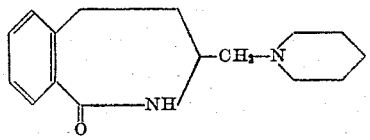

melts at 118–120° C. and is obtained in a yield of 89 percent.

Hydrochloric acid dissolved in ethyl acetate is added to a solution of the base in a small amount of alcohol until the reaction is acid. The mixture is then evaporated to dryness, and the residue is recrystallized from a mixture of alcohol and ethyl acetate. There is obtained the dihydrochloride of 2 - piperidinomethyl - 7 - oxo - 5:6 - benzo-1-azacycloheptane. It melts at 246.5–250.5° C.

*Example 3*

12.15 parts of 2 - (β - piperidinoethyl) - indanone - (1) are slowly introduced, while cooling, into 75 parts by volume of sulfuric acid of 90 percent strength, and mixed in the course of one hour, while stirring, at 0–5° C. with 4 parts of sodium azide. After one hour, the mixture is heated to room temperature and poured on to ice after a further 2 hours. The whole is mixed with solid potassium carbonate until it has an alkaline reaction, then taken up with ethyl acetate, and the ethyl acetate solution is dried over magnesium sulfate, filtered and evaporated in vacuo. The 3 - (β - piperidinoethyl) - 1 - oxo - 1:2:3:4 - tetrahydroisoquinoline of the formula

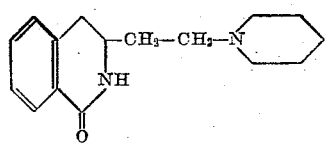

is obtained in this manner in a yield of 90 percent. When recrystallized from hexane it melts at 111–112° C. The 2-(β-piperidino-ethyl)-indanone-(1) used as starting material may be prepared as follows:

36.1 parts of benzyl-(β-piperidinoethyl)-malonic acid diethyl ester are added to 23 parts of potassium hydroxide in 20 parts by volume of water and 80 parts by volume of absolute alcohol, and the mixture is heated under reflux for 4 hours. The alcohol is then removed under reduced pressure, the aqueous paste is heated in an open vessel on a boiling water bath for a further hour, then neutralized with 40 parts by volume of hydrochloric acid of 37 percent strength, and the reaction product is slowly heated in an oil bath to 140–160° C. and maintained at that temperature for 2 hours. The residue obtained is pulverized after cooling, and added in the cold to 200 parts of polyphosphoric acid, and slowly heated to 120–140° C. while stirring, and maintained for 20 minutes at that temperature. The reaction mixture is cooled to 40° C., then taken up with water and ice, during which the temperature is maintained at 30–40° C., then rendered alkaline with solid potassium carbonate, extracted with ether, the ethereal layer is extracted with 4 N-hydrochloric acid, and the acid extract is rendered alkaline with potassium carbonate. The precipitated oil is taken up in ether, the ethereal solution is dried over calcined magnesium sulfate, and filtered after ½ hour and the ether is distilled. By distillation in vacuo there is obtained 2 - (β - piperidinoethyl) - indanone - (1) boiling at 132–134° C. under 0.2 mm. pressure. The yield is 75 percent.

*Example 4*

5.5 parts of 2 - (β - piperidino - ethyl) - tetralone - (1) are introduced at 0° C. into 30 parts by volume of sulfuric acid of 90 percent strength and treated with 2.5 parts of sodium azide in the course of 2 hours. The mixture is then stirred at 22° C. for a further hour, poured on to ice, mixed with solid potassium carbonate to render the reaction alkaline, extracted with chloroform, and the chloroform solution is dried over magnesium sulfate, filtered and evaporated. There is obtained 2-(β-piperidino-ethyl)-7-oxo-5:6-benzo-1-azacycloheptene-(5) of the formula

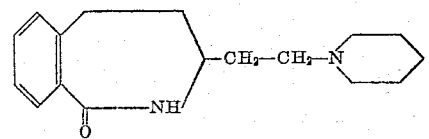

melting at 114.9–115.4° C. The yield amounts to 90 percent.

The 2-(β-piperidinoethyl)-tetralone-(1) used as starting material may be prepared as follows:

21 parts of β-phenylethyl-malonic acid are added in portions to 12.6 parts of dihydropyrane in 50 parts by volume of absolute benzene, the temperature being maintained below 30° C. by cooling. After 15 minutes the whole is poured on to ice and a saturated solution of potassium carbonate, and then, on the one hand, the aqueous phase is separated in a separating funnel and, on the other, the benzene solution is dried over magnesium sulfate, filtered, and the benzene is distilled off in vacuo, the temperature being maintained below 30° C.

37 parts of β-phenylethyl-malonic acid di-tetrahydropyranyl ester thus obtained in the form of an oil are slowly added to a suspension of 2.3 parts of metallic sodium in 200 parts by volume of absolute dioxane. The solution is heated to 90° C. 15 parts of N-(β-chlorethyl)-piperidine are then added in the course of one hour, and the whole is heated for a further 4 hours at 90–100° C. The dioxane is then distilled off under reduced pressure, the residue is taken up in benzene and washed with a saturated solution of potassium carbonate and sodium chloride solution, the benzene solution is dried over magnesium sulfate, evaporated in vacuo and the resulting oil is dried for one hour under a high vacuum. The resulting product is added at 110° C. in the course of 30 minutes to 200 parts of polyphosphoric acid, and then stirred for a further 20 minutes at 150° C. The reaction mixture is then cooled to 30–40° C., taken up in water, mixed with potassium carbonate until the reaction is alkaline, and extracted with ether. The ethereal solution is shaken with 4 N-hydrochloric acid and the aqueous portion is rendered alkaline with potassium carbonate. The oil which precipitates is taken up in ether, separated from water, dried over sodium sulfate, filtered and the ether is evaporated. In this manner 2-(β-piperidinoethyl)-tetralone-(1) is obtained in a 70 percent yield boiling at 155–159° C. under 0.4 mm. pressure.

*Example 5*

12.7 parts of 2-diethylaminomethyl-indanone-(1) hydrochloride are introduced in the cold into 50 parts by volume of sulfuric acid of 90 percent strength, and 4 parts of powdered sodium azide are added in the course of 2 hours at 0–5° C. After ½ hour further cooling is stopped, and after a further hour the reaction mixture is poured on to ice, then given an alkaline reaction by the addition of solid potassium carbonate, extracted with ethyl acetate, and the ethyl acetate layer is dried over magnesium sulfate, filtered, evaporated and the residue is distilled. There is obtained 3-diethylaminomethyl-1-oxo-1:2:3:4-tetrahydroisoquinoline of the formula

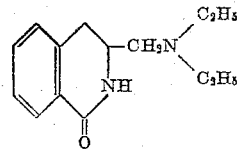

which boils at 176° C. under 1 mm. pressure.

When employing 2-dimethylaminomethyl-indanone-(1) as the starting material in the above example, there is obtained 3-dimethylaminomethyl-1-oxo-1:2:3:4-tetrahydro-isoquinoline.

Example 6

12.15 parts of 2-(β-piperidinoethyl)-indanone-(1) dissolved in 20 parts by volume of sulfuric acid of 90 percent strength are added in portions in the course of 4 hours to 50 parts of a 4 N-solution of hydrazoic acid in chloroform and 10 parts of sulfuric acid of 98 percent strength. After one hour the whole is poured on to ice, then mixed with solid potassium carbonate to produce an alkaline reaction, extracted with chloroform, and the chloroform solution is dried over magnesium sulfate, filtered and evaporated in vacuo. By recrystallizing the residue from hexane there is obtained the 3-(β-piperidino-ethyl)-1-oxo-1:2:3:4-tetrahydroisoquinoline described in Example 3.

Example 7

200 parts by volume of hydrochloric acid of 37 percent strength are cooled to 0° C. and mixed with 23.2 parts of 2-piperidinomethyl-cyclohexanone hydrochloride. 10 parts of finely powdered sodium azide are added at 0–5° C., while stirring, in the course of 1½ hours. After a further 1½ hours the whole is heated to room temperature and stirred for a further 4 hours at 22° C. The mixture is evaporated to dryness in vacuo, and the residue is mixed with saturated sodium carbonate solution until the reaction is alkaline. The mixture is then extracted several times with ethyl acetate, and the ethyl acetate solution is dried over magnesium sulfate, filtered and concentrated by evaporation. The residue is crystallized from hexane and there is obtained 2-piperidinomethyl-7-oxo-1-azacycloheptane of the formula

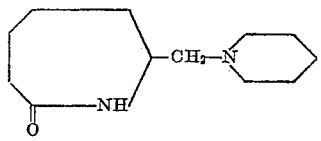

It melts at 86–88° C.

The base is dissolved in a small quantity of alcohol and mixed with hydrochloric acid in ethyl acetate until the reaction is weakly acid, and the solution is evaporated to dryness. The residue is crystallized from alcohol and there is obtained the hydrochloride of 2-piperidinomethyl-7-oxo-1-azacycloheptane melting at 267–269° C.

Example 8

3 parts of 2-(β-piperidinoethyl)-5:6-dimethoxy-indanone-(1) are dissolved in 20 parts by volume of sulfuric acid of 90 percent strength and treated with 1 part of sodium azide at 10° C. The whole is then kept at a temperature of 30–35° C. until the calculated quantity of nitrogen has formed. The reaction mixture is poured into ice water, mixed with ammonia to render the reaction alkaline and extracted with benzene. The benzene solution is dried over magnesium sulfate, filtered and evaporated. There is obtained 3-(β-piperidinoethyl)-6:7-dimethoxy-1-oxo-tetrahydroisoquinoline of the formula

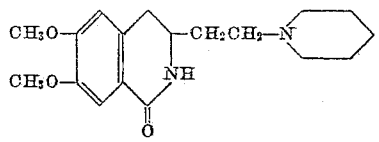

melting at 133–134° C. (from isopropyl ether).

The 2-(β-piperidinoethyl)-5:6-dimethoxy-indanone-(1) used as a starting material may be produced as follows:

156 parts of 3,4-dimethoxybenzyl-β-piperidinoethyl-malonic-acid diethyl ester are added to a solution of 87 parts of potassium hydroxide in 350 parts by volume of ethyl alcohol and the mixture is refluxed on a steam bath for 5 hours. The alcohol is distilled in vacuo and 155 parts by volume of concentrated hydrochloric acid are added to the residue. The mixture is evaporated to dryness and then heated to 150–160° C. for 2 hours at the water-jet aspirator. After cooling, the remaining glassy mass is pulverized.

50 parts of this powder are added to 500 parts of polyphosphoric acid at 60–70° C. and, after the addition is complete, the whole is slowly heated to 85–90° C., where an exothermic reaction sets in. Heating is discontinued until the temperature begins to drop, and then the mixture is kept at 85–90° C. for another 20 minutes.

After cooling, water is added and the clear aqueous solution is rendered alkaline by the addition of concentrated ammonia. The precipitating oil is extracted with benzene, the benzene solution dried and evaporated and the residue crystallized from isopropyl ether. It consists of 2-(β-piperidinoethyl)-5:6-dimethoxy-indanone-(1) and melts at 100–101° C.

Example 9

3.4 parts of 2-piperidinomethyl-3-phenyl-indanone-(1)-hydrochloride are introduced into 30 parts by volume of sulfuric acid of 90 percent strength while cooling and 0.85 part of sodium azide is added in the course of an hour at 0–5° C. The mixture is then stirred for 5 hours at room temperature and poured on to ice. Solid potassium carbonate is added to render the reaction alkaline, the whole extracted with chloroform, the chloroform solution dried with magnesium sulfate and evaporated in vacuo. There is obtained 1-oxo-3-piperidinomethyl-4-phenyl-1:2:3:4-tetrahydroisoquinoline of the formula

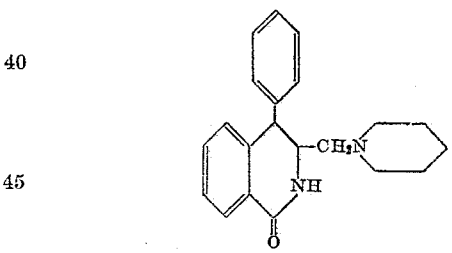

When recrystallized from a mixture of acetone and ether it melts at 158–160° C.

The 2-piperidinomethyl-3-phenyl-indanone-(1)-hydrochloride used as starting material can be prepared as follows: 20.8 parts of 3-phenyl-indanone-1 are heated with 12.5 parts of piperidine-hydrochloride, 3.0 parts of paraformaldehyde, 30 parts by volume of absolute alcohol and 0.3 part by volume of hydrochloric acid of 37 percent strength for an hour under reflux. 1.5 parts of paraformaldehyde are then added and the whole boiled for a further 3 hours, evaporated in vacuo and the resulting residue crystallized from acetone. There is obtained crude crystalline 2-piperidino-3-phenyl-indanone-(1)-hydrochloride in a yield of 62 percent. This salt is dissolved in water, the aqueous solution rendered alkaline by the addition of solid potassium carbonate and the precipitating oil taken up in ether. The ethereal solution is evaporated to dryness, the residue taken up in a little alcohol and this solution mixed with an excess of hydrochloric acid in ethylacetate. There is obtained the pure hydrochloride which, when recrystallized from acetone, decomposes at 150–200° C.

Example 10

37.2 parts by weight of crude 2-piperidinomethyl-4-phenyl-tetralone-(1)-hydrochloride are introduced while stirring into 260 parts by volume of sulfuric acid of 90 percent strength at 0° C., and 8.75 parts by weight of finely pulverized sodium azide are then added in small portions in the course of two hours. The whole is stirred for 4 hours, poured on to ice, rendered neutral with concentrated ammonia, and extracted exhaustively with chloroform. The chloroform extracts are dried with magnesium sulfate and evaporated. 25.4 parts by weight of 2-piperidinomethyl-4-phenyl-7-oxo-5:6-benzo-1-azacycloheptene-(5) of the formula

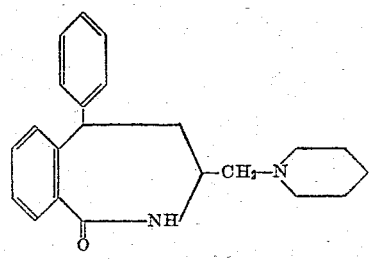

melting at 217–219° C. (73%) crystallize from a mixture of acetone and ether.

The 2-piperidino-methyl-4-phenyl-tetralone-(1) used as starting material can be prepared as follows:

44.4 parts by weight of 4-phenyl-tetralone-(1), 24.1 parts by weight of piperidine hydrochloride, 9.0 parts by weight of paraformaldehyde, 60 parts by volume of absolute alcohol and 0.5 part by volume of hydrochloric acid of 37 percent strength are boiled for an hour under reflux, 4.5 parts by weight of paraformaldehyde are added and the whole is then boiled for another 3 hours under reflux. After evaporation in vacuo the product is crystallized from acetone. Yield is 44.9 parts by weight of crude crystalline 2-piperidino-methyl-4-phenyl-tetralone-(1)-hydrochloride which decompose at 195–230° C.

*Example 11*

7 parts of 2-(β-dimethylamino-propyl)-5:6-dimethoxy-indanone-(1) are dissolved in 40 parts by volume of sulfuric acid of 90% strength and then 2.5 parts of sodium azide are added. The mixture is stirred for 12 hours at 35° C., until the nitrogen evolution ceases. The whole is poured on to crushed ice and rendered alkaline by the addition of concentrated aqueous ammonia. The precipitating oil is extrated with benzene, the benzene solution dried, filtered and evaporated, and the residue distilled in vacuo. The 3-(β-dimethyl-amino - propyl) - 6:7 - dimethoxy-1 - oxo-tetrahydroisoquinoline of the formula

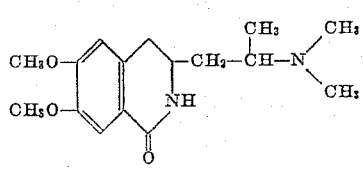

distills at 180–190° C. under 0.01 mm. pressure.

The 2-(β - dimethyl-amino-propyl) - 5:6 - dimethoxy-indanone-(1) used as a starting material may be prepared as follows:

9 parts of 3:4-dimethoxybenzyl - β - dimethyl-amino-propyl-malonic acid di-ethyl-ester are added to a solution prepared from 5 parts of potassium hydroxide in 20 parts by volume of alcohol, and the resulting mixture is refluxed for 5 hours. The alcohol is distilled in vacuo, the residue acidified by the addition of concentrated hydrochloric acid and evaporated to dryness. This mixture is heated to 150–160° C. for 2 hours at a water-jet aspirator. The cooled, glassy mass is powdered, and introduced into the ten-fold amount of polyphosphoric acid at 60–70° C. The mixture is heated slowly until, at 85–90° C., an exothermic reaction sets in, whereupon the heating is discontinued until the temperature begins to drop. Then the mixture is heated to 85–90° C. for another 20 minutes. After cooling the remaining resin is dissolved in water, rendered alkaline by the addition of ammonia and extracted with benzene. The benzene solution is dried, evaporated to dryness and the residue dissolved in a little alcohol. By the addition of hydrochloric acid in ethyl acetate the hydrochloride of 2-(β-dimethylamino - propyl)-5,6-dimethoxy - indanone - (1) is formed, which melts at 226–227° C.

What is claimed is:

1. A process for the manufacture of a tertiary amino-lower alkyl-oxo-azacarbocyclic compound which comprises reacting with hydrazoic acid a compound of the formula

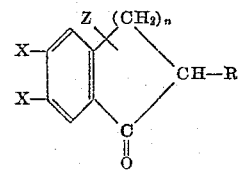

wherein X stands for a member of the group consisting of hydrogen and methoxy, Z represents a member of the group consisting of hydrogen and phenyl, R stands for a tertiary amino-lower alkyl group, and n is one of the intergers 1 and 2.

2. A process as claimed in claim 1, wherein a 2-(tertiary amino-lower alkyl)-indanone-(1) is employed as starting material.

3. A process as claimed in claim 1, wherein the hydrazoic acid is formed in the reaction medium from an azide.

4. A process as claimed in claim 3, wherein the azide is sodium azide.

5. A process as claimed in claim 1, wherein the reaction is carried out in the presence of highly concentrated sulfuric acid.

6. A member selected from the group consisting of a compound of the formula

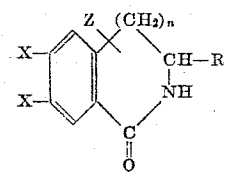

and the acid addition salts thereof, wherein X stands for a member of the group consisting of hydrogen and methoxy, Z represents a member of the group consisting of hydrogen and phenyl, R stands for a tertiary amino-lower alkyl group, and n is one of the integers 1 and 2.

7. A process which comprises reacting a 2-(tertiary amino - lower alkyl) - 1 - oxo-hexacarbocycle with hydrazoic acid so as to produce a 2-(tertiary amino-lower alkyl)-7-oxo-1-azaheptacarbocycle.

8. A process which comprises reacting a 2-(tertiary amino-lower alkyl) - tetralone - (1) with hydrazoic acid so as to produce a 2 - (tertiary amino-lower alkyl)-7-oxo-5:6-benzo-1-azacycloheptene-(5).

9. 2 - piperidino - methyl - 7 - oxo - 5:6-benzo-1-azacycloheptene-(5).

10. 2-(β-piperidino - ethyl) - 7 - oxo - 5:6-benzo-1-azacycloheptene-(5).

11. 3 - (β-piperidino - ethyl) - 6,7 - dimethoxy - 1-oxo-1:2:3:4-tetrahydroisoquinoline.

12. 2 - piperidino - methyl - 4 - phenyl - 7 - oxo - 5:6-benzo-1-aza-cycloheptane-(5).

13. 3 - (tertiary amino - lower alkyl)-1-oxo-1:2:3:4-tetrahydro-isoquinoline.

14. 2-(tertiary amino - lower alkyl) - 7 - oxo - 5:6-benzo-1-aza-cycloheptene-(5).

References Cited in the file of this patent

UNITED STATES PATENTS

| | | |
|---|---|---|
| 1,564,631 | Schmidt | Dec. 8, 1925 |
| 1,637,661 | Schmidt | Aug. 2, 1927 |
| 1,941,312 | Miescher | Dec. 26, 1933 |
| 2,529,924 | Dickey | Nov. 14, 1950 |
| 2,640,829 | Wilson et al. | June 2, 1953 |

FOREIGN PATENTS

| | | |
|---|---|---|
| 1,062,598 | France | Dec. 9, 1953 |

OTHER REFERENCES

Adams et al.: "Organic Reactions," vol. III, pp. 308–326 (1947).